C. S. BABB.
PIPE JOINT AND METHOD OF PRODUCING IT.
APPLICATION FILED JAN. 22, 1921.
1,414,800.
Patented May 2, 1922.
FIG. I.
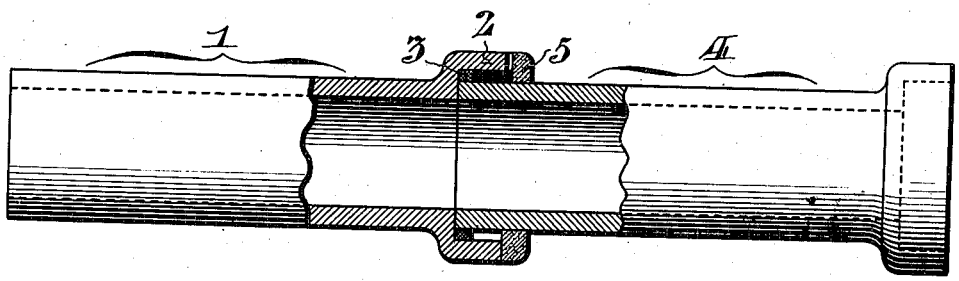
FIG. II.
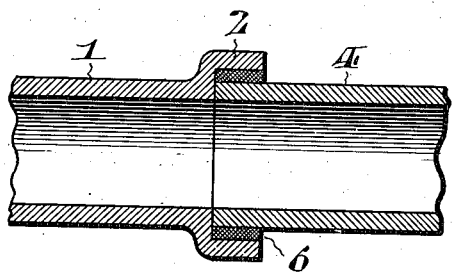
WITNESSES:
John E. Bergner
James H. Bell
INVENTOR:
Charles Stewart Babb,
BY
Tracy & Paul
ATTORNEYS.

UNITED STATES PATENT OFFICE.

CHARLES STEWART BABB, OF CHICAGO, ILLINOIS, ASSIGNOR TO THE BARBER ASPHALT PAVING COMPANY, OF PHILADELPHIA, PENNSYLVANIA, A CORPORATION OF WEST VIRGINIA.

PIPE JOINT AND METHOD OF PRODUCING IT.

1,414,800. Specification of Letters Patent. Patented May 2, 1922.

Application filed January 22, 1921. Serial No. 439,283.

*To all whom it may concern:*

Be it known that I, CHARLES S. BABB, a citizen of the United States, residing at Chicago, county of Cook, and State of Illinois, have invented certain new and useful Improvements in Pipe Joints and Methods of Producing Them, of which the following is a specification, reference being had to the accompanying drawings.

My invention relates to a pipe joint especially adapted for use in sewer pipes, the joints of which are filled with an asphaltic or other similar pipe joint cement poured in hot, and therefore fluid, but which, when it has cooled, sets to form a hard and rigid juncture. In using such a pipe joint cement, it is necessary to calk the joint where the end of the spigot of one pipe section fits against the shoulder of the bell of the next pipe section. My invention comprises a calking ring which performs the double function of properly centering the pipe sections and of preventing the hot liquid cement from running through the joint inside the pipe. When the pipe joint cement has hardened, the calking ring has no further function to perform, but being embedded in the structure, cannot be removed. Heretofore, these calking rings have been made of tarred oakum or similar material. But organic material such as this ultimately disintegrates under the influence of acids present in sewer pipes, and when eaten away, the resulting space weakens the pipe construction. My invention involves the provision of a permanent and indestructible calking ring which not only performs the centering and sealing functions but which is capable of amalgamating with and forming part of the cementing ring proper, and which, at the same time, is indestructible and permanent.

In the accompanying drawings, Fig. I is a sectional view of a pipe joint having my calking ring in place at the shoulder of the bell, prior to the pouring in of the hot pipe joint cement for the making of the permanent joint.

Fig. II is a sectional view showing the pipe joint as completed.

Referring to Fig. I, it will be noted that within the shoulder of the bell 2 of pipe section 1, there is placed a calking ring 3 embodying my invention. This calking ring is of a rubbery, somewhat elastic, but very tough nature, not susceptible to ordinary temperature changes, nor of being attacked by the fluids of a sewer pipe. It is made of air blown or oxidized hydrocarbon, and is produced in suitable strips, which are cut into lengths and are sufficiently elastic to permit them to be bent into the form of a ring. For example when asphaltic petroleum, preferably containing a high amount of sulphur, such as Mexican petroleum, is reduced by distillation to a residuum of say about 400° F. flash point and then air blown at about 450° F. until it attains a melting point of from 200° to 250° F., there is produced a tough, rubbery material which is very suitable for the purposes of my invention. It is sufficiently plastic to permit the spigot of the pipe section 4 to be forced into the ring under pressure, the ring being of such diameter as to properly center the pipe sections and to produce a seal when the sections have been forced into place. In this position, a split ring or runner band 5 of clay or other appropriate material is placed around the spigot end of section 4 abutting against the bell end of section 1 and so tightly surrounding section 4 as to form a closed space between itself and the calking ring. A groove 6 formed at one point in the edge of the bell affords an orifice through which hot pipe joint cement is poured to form the completed joint. This cement is a hard composition formed by fluxing natural asphalts, as for example trinidad or gilsonite asphalt cements or a combination of the two, reinforced with from 25 to 50% of an inert filler such as fullers' earth. It is of such a character that when heated to about 400° F. for use, it is sufficiently fluid to be freely poured, as I have described, so as to fill the space between interfitting pipe sections; but at atmospheric temperatures, it is hard and tough, water proof and acid proof, and strong enough to retain its shape and position under all the strains to which sewer pipe is liable to be subjected. It is unaffected by ordinary extremes of temperature, and therefore it is not displaced when the pipe joint is subjected to pressure or strains. It is a characteristic advantage of my invention that hot pipe joint cement, such as I have described, when poured in place as explained, fuses the surface of the calking ring with which it comes in contact, and superficially amalgamates with it without, however, melting the whole of said calking ring. This latter contingency would be objectionable, permitting the escape of the hot pipe joint cement into the inside of the pipe, but the superficial fusing of the ring and its amalgamation with the rest of the joint produces a homogeneous structure which when the band 5 is removed, assumes the appearance shown at 6 in Fig. II.

I am aware that it has heretofore been proposed to seal pipe joints by the use of prepared bituminous packing rings softened sufficiently by a solvent to permit the spigot end of the pipe to be forced into place within it, but such rings have occupied the entire joint space and have been found to not possess sufficient strength and rigidity to permanently hold the pipe sections in place under the strains of use. It is characteristic of my invention that, although the calking ring possesses sufficient elasticity to permit the forcing together of adjacent sections of pipe, and to hold them in place during the sealing of the joint, the ultimate formation of the joint by the cold pipe cement is hard, strong and rigid without being brittle or pliable, and not liable under pressure to be forced out of place.

Having thus described my invention, I claim:

1. A pipe joint having a calking ring formed of air blown petroleum residuum having a sufficiently rubbery consistency without heating or solution to permit the spigot of one pipe section to be forced into place within it, and to center this and the adjoining pipe section and at the same time to seal the joint preparatory to the pouring of hot pipe joint cement between the sections.

2. A pipe joint within the bell of one pipe section and surrounding the spigot of the adjoining section comprising two parallel rings of differing materials, the ring nearest the shoulder of the bell consisting of a blown hydrocarbon of a tough and rubbery nature, and the other ring being composed of a hard bituminous cement capable of being poured when hot, but which, at ordinary temperatures is strong and rigid.

3. A pipe joint comprising a tough and rubbery ring of blown hydrocarbon, and an adjacent hard and rigid ring of asphalt cement amalgamated together by pouring the asphalt cement ring into place when hot whereby the adjoining surface of the other ring is fused with resulting complete amalgamation of the two rings.

4. The method of forming a pipe joint, which consists in placing within the shoulder of the bell of a pipe section a calking ring of blown hydrocarbon having rubbery and plastic consistency, forcing a spigot of another pipe section within said calking ring whereby the two pipe sections are centered and the joint between them sealed, pouring into the remaining space between the spigot and bell a melted bituminous cement with resulting fusion of the surface of the calking ring and amalgamation of the two materials, and permitting the two to cool and solidify, whereby the resulting pipe joint is strong, and rigid and wholly indestructible by disintegrating influences.

In testimony whereof, I have hereunto signed my name at Chicago, Illinois, this 13th day of January, 1921.

CHARLES STEWART BABB.

Witnesses:
J. J. KENDRICK,
CARL F. HABER.